US006919314B1

(12) United States Patent
Schlothauer et al.

(10) Patent No.: US 6,919,314 B1
(45) Date of Patent: Jul. 19, 2005

(54) BIOACTIVE WHEY PROTEIN HYDROLYSATE

(75) Inventors: Ralf-Christian Schlothauer, Palmerston North (NZ); Linda May Schollum, Palmerston North (NZ); Anne Maria Singh, Palmerston North (NZ); Julian Robert Reid, Palmerston North (NZ)

(73) Assignee: New Zealand Dairy Board, Wellington (NZ)

( * ) Notice: Subject to any disclaimer, the term of this patent is extended or adjusted under 35 U.S.C. 154(b) by 0 days.

(21) Appl. No.: 09/720,041

(22) PCT Filed: Jun. 14, 1999

(86) PCT No.: PCT/NZ99/00084

§ 371 (c)(1),
(2), (4) Date: Apr. 2, 2001

(87) PCT Pub. No.: WO99/65326

PCT Pub. Date: Dec. 23, 1999

(30) Foreign Application Priority Data

Jun. 17, 1998 (NZ) .............................................. 330710

(51) Int. Cl.[7] ........................ A61K 38/10; A61K 38/08; A61K 38/06; C12P 21/06
(52) U.S. Cl. ............................. 514/13; 514/17; 514/18; 514/2; 530/326; 530/329; 530/330; 530/331; 530/343; 530/344; 530/300; 530/316; 435/68.1; 930/40
(58) Field of Search .............................. 514/13, 17, 18, 514/2; 530/326, 329, 330, 331, 343, 344, 300, 316; 435/68.1; 930/40

(56) References Cited

U.S. PATENT DOCUMENTS

| | | | |
|---|---|---|---|
| 3,843,621 A | * | 10/1974 | Strachan ...................... 103/52 |
| 3,970,520 A | | 7/1976 | Feldman et al. |
| 4,358,464 A | | 11/1982 | Soehnlen |
| 4,847,096 A | * | 7/1989 | Mellqvist et al. ............. 426/41 |
| 4,918,008 A | | 4/1990 | Gauri |
| 4,981,704 A | | 1/1991 | Thibault |
| 5,039,532 A | | 8/1991 | Jost et al. |
| 5,405,637 A | | 4/1995 | Martinez et al. |
| 5,589,357 A | | 12/1996 | Martinez et al. |
| 5,744,179 A | | 4/1998 | Shimamura et al. |
| 5,780,439 A | | 7/1998 | Mendy et al. |
| 5,837,312 A | | 11/1998 | Cordle et al. |

FOREIGN PATENT DOCUMENTS

| | | |
|---|---|---|
| EP | 065663 | 12/1982 |
| EP | 117047 | 8/1984 |
| EP | 0322589 | 7/1989 |
| EP | 0421309 A2 | 4/1991 |
| EP | 474 506 A1 | 9/1991 |
| EP | 799577 | 10/1997 |
| EP | 474506 B1 | 5/1998 |
| FR | 2309154 | 11/1976 |
| JP | GB 996857 | 10/1992 |
| JP | 04-282398 | 10/1992 |
| JP | 04282400 | 10/1992 |
| JP | 05103595 A | 4/1993 |
| JP | 06-345664 | 12/1994 |
| JP | 8056568 | 3/1996 |
| JP | 8098656 | 4/1996 |
| JP | 9047229 | 2/1997 |
| JP | 10033115 | 2/1998 |

(Continued)

OTHER PUBLICATIONS

Abubakar et al (Tohoku Journal of Agricultural Research 47(1–2):1–8 (1996).*
Chemical Abstracts 114:82552 (Komura et al), 1990.*
Mullally et al., "Angiotensin–I–converting enzyme inhibitory activities of gastric and pancreatic proeinase digest of whey proteins." *International Diary Journal*, vol. No. 7, (1997), pp. 229–303, XP00953726; Correspondence (Reprint) address, R.J. Fitzgerald, Dep. Of Life Sci., Univ. of Limerick, Limerick, Republic of Ireland; the whole document.
Nakamura Y. Yamamoto N. et al., Antihypertensive effect of peptides derived from casein by an extracellular proteinase form Lactobacillus helveticus CP790. *Journal of Diary Science* 77:917–922 (1994).
Roy, G. "Bitterness: reduction and inhibition." *Trends in Food Science and Technology* 3:85–91 (1992).
Yamamoto et al. "Antihypertensive peptides derived from food proteins" *Biopolymers* 43:129–134 (1997).
Adler–Nissen J: "Enzymic hydrolysis of food proteins" 1986, *Elsevier Applied Science Publishers*, London and NY XP002122275 p. 59–62 and p. 94–96.
Bernal and Jelen "Effectiveness of lactose hydrolysis in Cottage cheese Whey for the development of whey drinks" *Milchwissenchaft* 44:222–225 (1989).
Cushman D W & Cheung HS. "Spectrophotometric assay and properties of the angiotensin converting enzyme in rabbit lung" *Biochem. Pharmacol.* 20:163 7–1648 (1971).
Maubois et al., "Les peptides du lait a activite physiologique III. Peptides du lait a effect cardiovaculaire: activites anti-thrombotique" *Lait* 71,249:955 (1991).
Masuda et al., "Angiotensin I converting enzyme inhibitory peptides generated from sardine muscle by protease of food industry" *Journal of the Japanese Society for Food Science and Technology* 39(8):678–683 (1992–abstract.
Reed, G. "Enzymes in Food Processing," Academic Press, Second Edition, pp. 33–37, Apr. 1975.

*Primary Examiner*—Francisco Prats
(74) *Attorney, Agent, or Firm*—Knobbe, Martens Olson & Bear LLP

(57) ABSTRACT

The invention relates to a partial hydrolysate of whey protein which contains bioactive peptides but does not have a bitter flavor. The hydrolysate is carried out using selective enzymes which produce the active peptides and is terminated at a degree of hydrolysis before substantial bitter flavors are created. There are also described novel peptides and a method of reducing systolic blood pressure through the administration of the peptides.

2 Claims, 3 Drawing Sheets

FOREIGN PATENT DOCUMENTS

| | | |
|---|---|---|
| WO | WO 9304593 | 3/1993 |
| WO | WO 93/24020 | 12/1993 |
| WO | WO 96/11584 | 4/1996 |
| WO | WO 01/85984 A1 | 11/2001 |

* cited by examiner

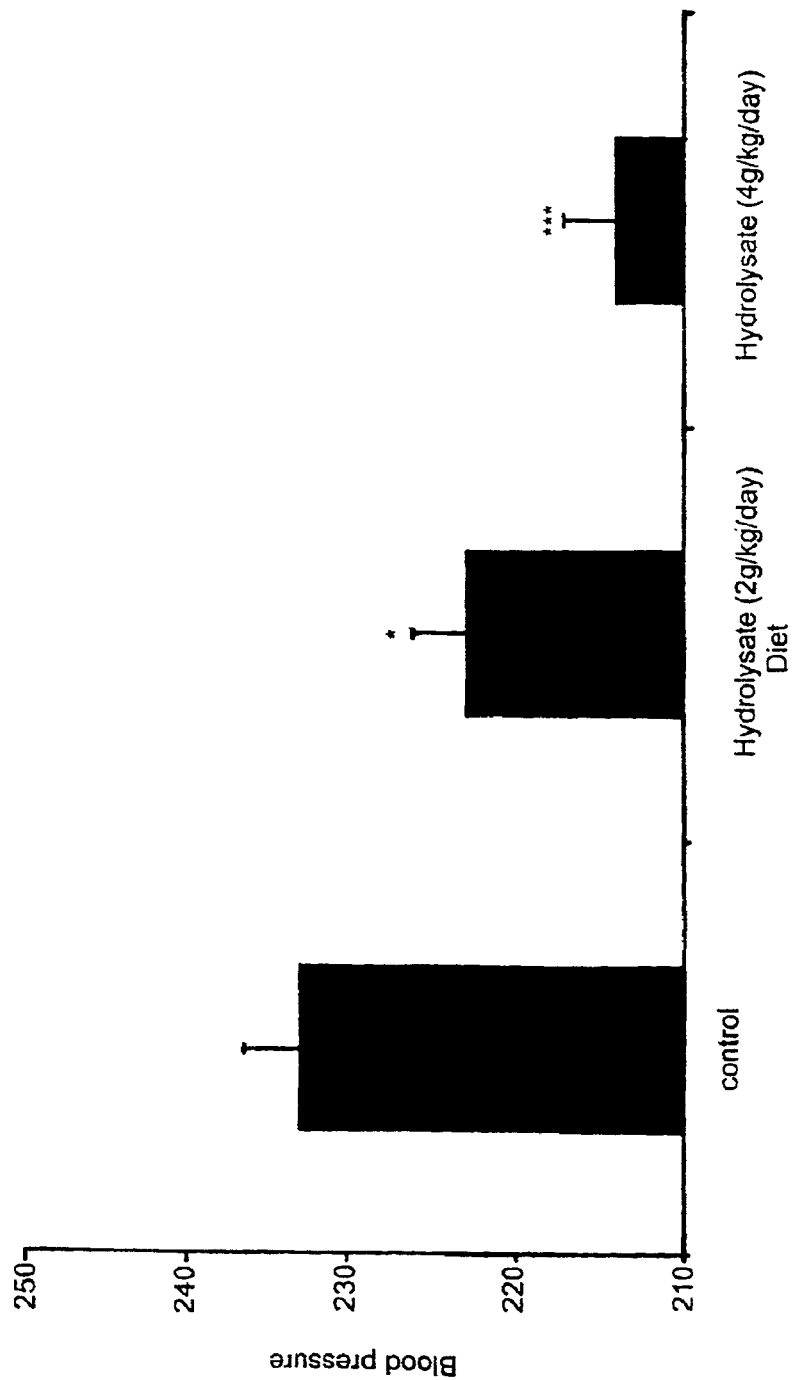

BIOACTIVE WHEY PROTEIN HYDROLYSATE

TECHNICAL FIELD

This invention relates to a process for producing hydrolysed whey protein products which are free of bitter flavours and which contain bioactive peptides. The products of the process have high digestibility and good organoleptic properties. The products may have either a bland or slightly sweet taste and are free of soapy or brothy flavours. The hydrolysed whey protein products may optionally contain oligosaccharides and are useful sources of bioactive peptides for incorporation into functional foods.

BACKGROUND ART

A number of food ingredients and foodstuffs have been produced from the hydrolysis of a protein source such as the milk proteins, casein and whey proteins.

Hydrolysed protein foodstuffs may have advantages over non-hydrolysed protein foodstuffs in a number of areas of health care. For example, it is known that enzymatically hydrolysed proteins are less allergenic. They are also more rapidly digested and absorbed than whole proteins. Foodstuffs containing hydrolysed proteins are also useful in the alimentation of hospital patients with digestive diseases for example.

Hydrolysis of whey proteins and caseins is known to release bioactive peptides that can exhibit a number of physiological effects (Maubois et al, 1991; EP 475506). A number of publications describe such bioactive peptides, for example, ACE inhibiting peptides which have antihypertensive properties have been released through an enzymatic treatment of bovine β-lactoglobulin and whey protein concentrates (Mullally et al, 1997). ACE inhibitory peptides are also found in sour milk and in hydrolysates of α, and β casein (JP 4282400; Nakamura et al 1994, Yamamoto et al 1994).

EP 4745506 discloses the hydrolysis of the milk protein lactoferrin in whey to release lactoferricin which acts as an antimicrobial agent useful for treating diarrhoea, athlete's foot, eye infections, mastitis etc in humans and animals.

However, the hydrolysis of most food proteins, especially the hydrolysis of whey and casein containing products, is known to generate bitterness. This causes palatability problems particularly when attempting to formulate orally ingestible products incorporating milk protein hydrolysates as a source of bioactive peptides.

In the field of protein hydrolysis one or both of two approaches are commonly used for controlling or removing bitterness in protein hydrolysates to increase palatability of the products.

The extensive hydrolysis of the protein substrate is known to reduce bitterness in milk protein hydrolysates (EP 065663; EP 117047; U.S. Pat. No. 3,970,520). Less bitter products are produced relatively easily and cheaply in this way. However, extensive hydrolysis reduces the chain lengths of all peptides, including the bioactive peptides of interest. Extensive hydrolysis of the protein substrate destroys the functional and biological activity of the peptide of interest. In addition soapy and brothy off-flavours often develop, with the consequence that the palatability of the final product remains poor compared to the original bland tasting protein substrate. A final disadvantage is that for some hydrolysates the bitterness is only partially removed (Roy 1992 and 1997).

A second common method for the control of bitterness in protein hydrolysates is to use debittering enzymes, in particular those sourced from *Aspergillus oryzae*.

"Bitterness" generation in protein hydrolysis is thought to be due to the presence of large hydrophobic 'bitter' peptides. Debittering enzymes selectively hydrolyse bitter peptides present in the protein hydrolysates. A worker skilled in the art can—by the judicious selection of debittering enzymes and the conditions of treatment—effectively debitter milk protein hydrolysates leaving intact the particular bioactive peptides of interest. However, use of debittering enzymes makes the process more expensive, and preservation of some of the bioactive peptide is not easily or sucessfully achieved. A further disadvantage is that debittering enzymes treatments have a tendency to release free amino acids into the final product and, as a consequence, the hydrolysates develop unpleasant brothy or soapy flavours (Roy 1992 and 1997).

The various methods of debittering the protein hydrolysates result in additional process steps and add costs to the manufacture of the final product. In addition the final product also becomes overbalanced in its supply of free amino acids.

It would be most advantageous if a process for hydrolysing protein could be developed which releases bioactive peptides of interest and which limits the formation of bitter peptides and free amino acids, thereby allowing the original bland taste of the milk proteins substrates to be retained.

Some bioactive peptides—in particular the antihypertensive peptides—are relatively stable during protein hydrolysis and are released very early during the hydrolysis of the milk protein substrate as shown in FIG. 1.

The bitter flavours of milk protein hydrolysates can be improved by adding sugars or by hydrolysing natural sugars, such as lactose, already present in the milk protein substrate (Bernal and Jelen, 1989). For example sour wheys and cheese wheys are made more palatable when they have been sweetened by β-galactosidase and lactose hydrolysis of lactose (FR 2309154; U.S. Pat. No. 4,358,464; JP 8056568).

In order to achieve a high flavour acceptability for a hydrolysed protein product which contains bioactive peptides, precise control of hydrolysis is required to prevent bitterness occurring.

A common method of termination of hydrolysis is by deactivation of the enzymes, usually by thermal deactivation at high temperatures, typically >90–100° C. for an extended period of time. However, this method cannot be used to stop the hydrolysis of whey proteins as any intact hydrolysed whey proteins remaining in the mixture would denature and precipitate making the final product less soluble and less acceptable for the use as a food ingredient.

It would be advantageous if a process of hydrolysing whey protein could be controlled so that it directly pro a hydrolysate comprising bioactive peptides for incorporation into functional foods which did not taste bitter and where the enzyme inactivation steps did not compromise the integrity of the intact proteins in the final product.

It is an object of the invention to go some way towards achieving these desiderata or at least to offer the public a useful choice.

SUMMARY OF THE INVENTION

Accordingly the invention includes a process for preparing a whey protein hydrolysate containing bioactive peptides which comprises:

i) hydrolysing a whey protein-containing substrate with at least one heat labile protease, at a temperature of between about 20° C. and 65° C. at a pH of about 6 to about 8 when said enzyme is a neutral protease, at a pH of about 3 to about 5 when said enzyme is an acid protease, and at a pH of about 5 to about 10 when said enzyme in an alkaline protease;

ii) terminating said hydrolysis when a degree of hydrolysis of no greater than 10% has been reached by deactivating said protease under conditions which produce a water soluble hydrolysate; and (iii) testing said hydrolysate for a biological activity selected from the group consisting of inhibition of angiotensin converting enzyme (ACE) activity and reduction of in vivo blood pressure.

Preferably said substrate is sweet whey or sweet whey protein concentrate.

Preferably the enzyme is selected from the group consisting of Protease P6, Protease A. Protease M, Peptidase, Neutrase, Validase, and AFP 2000.

Preferably said enzyme deactivating step iv) comprises heat deactivation.

Preferably said heat deactivation comprises heating said hydrolysate for up to ten seconds to a temperature up to 95° C.

Preferably said enzyme deactivating step comprises altering the pH of said whey protein-containing substrate to a pH at which said protease is not active.

Preferably said enzyme deactivating step includes heat deactivation as defined above.

In another embodiment the invention consists in a whey protein hydrolysate containing one or more bioactive peptides selected from the group consisting of AFE, LFSH (SEQ ID NO: 1), ILKEKH (SEQ ID NO: 2), LIVTQ (SEQ ID NO: 3), MKG, LDIQK (SEQ ID NO: 4), ALPMH (SEQ ID NO: 5), VTSTAV (SEQ ID NO: 6), LVYPFPGPIPNSLPQNIPP (SEQ ID NO: 8) and LFRQ (SEQ ID NO: 9).

Alternatively said enzyme is immobilized on an inert support during said hydrolysis step ii).

Preferably said inert support is Roehn Eupergit, carrageenan particles, chitosan particles or any other suitable inert support material.

Preferably the degree of hydrolysis is from about 3% to about 5%.

Preferably the substrate also contains lactose, in an amount of up to 50% by weight.

Alternatively, the substrate also contains lactose in an amount of up to 30% by weight.

Preferably the substrate is also treated with lactase and/or β-galactosidase, either before or during the whey protein hydrolysis, to hydrolysis the lactose to galactose and glucose and synthesize galacto-oligosaccharides.

In another embodiment the invention consists in a whey protein hydrolysate containing one or more bioactive peptides selected from the group consisting of AFE, LFSH, ILKEKH, LIVTQ, MKG, LDIQK, VF, ALPMH, VTSTAV, LHLPLP, LVYPFPGPIPNSLPQNIPP and LFRQ.

The enzyme hydrolysis may be carried out under conditions which are suitable for the particular enzyme used as would be understood by a person skilled in the art.

The whey protein substrates are hydrolysed at a concentration in the range from 5–50% solids and the enzyme or enzyme mixtures are added to give an enzyme to substrate ratio between 0.01% and 3% w/w total solids, preferably between 0.01% and 1.0% w/w total solids.

Protein substrates treated with acid proteases may be hydrolysed at pH between 2.5 and 6.0, preferably between pH 3.0 and 5.0.

Protein substrates treated with neutral proteases may be hydrolysed at pH between 3.5 and 9.0, preferably between pH 6.0 and 8.0.

Protein substrates treated with alkaline proteases may be hydrolysed at pH range between 5 and 10.0, preferably between pH 6.0 and 8.0.

The protein hydrolysis may be carried out at a temperature range of from 30–65° C., preferably from 50–60° C.

The hydrolysis of lactose may be carried out at a prior stage to the whey protein hydrolysis, concurrently therewith or subsequently. The enzymes used for lactose or fungal sources eg *Klyvermyces lactis, Saccharomyces lactis, Saccharomyces fragillis*, eg *Aspergillus niger, Aspergillus oryzae* such as Maxilact (Gist Brocades) and Novolact (Novo Nordisk). The lactose hydrolysis is carried out under conditions which would be known to persons skilled in the art.

In one embodiment termination of the hydrolysis is achieved by deactivating the one or more whey protein hydrolysis enzymes (and/or the lactose hydrolysis enzymes added previously) by firstly changing the pH of the reaction mixture to a pH in which the enzyme(s) is either inactive or less active, and/or heating the reaction mixture to a comparatively mild temperature using a heat exchanger to denature the enzyme but not the intact whey proteins in the substrate. A suitable temperature range which would denature the enzymes is in the order of 55–70° C., preferably 65° C.

According to one option, depending on the enzyme(s) used, the enzyme or enzyme mixture may also be deactivated by the evaporation and drying procedures.

According to another option the enzyme or enzyme mixture may also be deactivated with or without a prior pH change.

Alternatively, the one or more enzymes used to selectively hydrolysis the whey protein may be immobilized on an inert support such as Roehm Eupergit, Carrageenan particles, chitosan particles or any other suitable material and then used in a stirred tank or fixed bed reactor or on a membrane or on a hollow fiber reactor.

Alternatively, the enzyme(s) to be used for the hydrolysis could be cross linked to suitable inert support prior to the hydrolysis reaction and subsequently separated out of the hydrolysis reaction with the use of a microfiltration membrane.

Alternatively, the enzyme can be separated away from the hydrolysis mixture with the use of an ultrafiltration membrane with a nominal molecular weight cutoff in the range 10–500 kDa once hydrolysis is complete.

After hydrolysis and optional deactivation or removal of enzymes, the hydrolysis may optionally be subjected to reverse osmosis under conditions whereby salt and water are removed from the hydrolysate. The purified desalted hydrolysis comprising whey proteins and bioactive peptides is then recovered. If lactose hydrolysis is also chosen then the hydrolysis will also contain glucose, galactose and/or galacto-oligosaccharides.

Optionally the hydrolysed whey proteins containing the bioactive peptide fraction can be separated with a UF membrane of 5–200 kDa cut off, preferably 10–50 kDa cut off. The bioactive peptides, other peptides and, optionally, hydrolysis lactose is recovered in the permeate.

According to another option ion exchange or hydrophobic adsorption or hydrophobic interaction chromatography or combinations of these processes may be used to recover the hydrolysed bioactive fraction from the hydrolysates in an enriched form.

In addition, lactase and β-galactosidase hydrolysis of lactose produces galacto-oligosaccharides which are known to stimulate the growth of beneficial gut flora thereby adding to the bioactive properties of the hydrolysates.

Hydrolysates which have been treated to further hydrolysis lactose are useful as food additives for consumers who are lactose intolerant.

The hydrolysed whey protein product of the invention has one or more of the following features:

antihypertensive ACE-I activity bifidus growth promoting activity non-gluey, non-bitter flavour pleasant to slightly sweet taste good organoleptic properties.

The invention consists in the foregoing and also envisages constructions of which the following gives examples.

BRIEF DESCRIPTION OF THE DRAWINGS

The present invention will now be described with reference to the accompanying drawings in which:

FIG. 3 is a plot of a least squares means analysis of rats fed with a control of commercial rat chow against groups of rats fed with hydrolysate at two different concentrations per day.

DETAILED DESCRIPTION OF THE INVENTION

Figure 1:
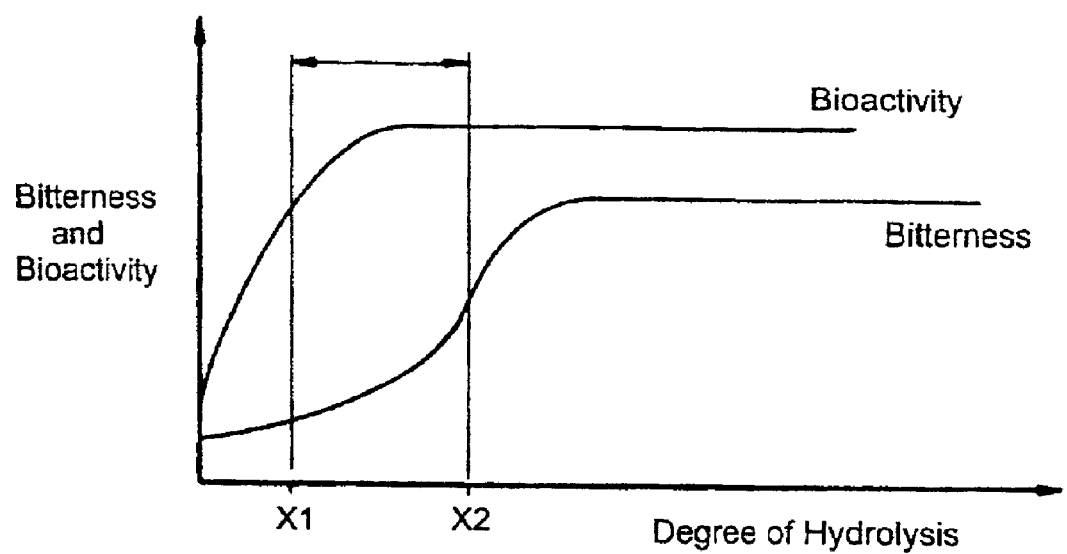
FIG. 1 is a plot of bitterness and bioactivity on the ordinant against the degree of hydrolysis on the abscissa. The 'opportunity window' of obtaining a product according to the present invention containing bioactive peptides and having acceptable flavours before the hydrolysis reaction produces bitter peptides is between the lines $x_1$ and $x_2$.

As discussed above, the present invention provides a process for producing a hydrolysed whey protein product containing bioactive peptides, whereby the hydrolysis is carried out under a high degree of control to prevent undesirable flavours developing during hydrolysis (eg bitter, soapy and brothy). The hydrolysis is terminated within the "opportunity window", ie before the emergence of substantial bitterness—as shown in FIG. 1—to provide hydrolysates having good organoleptic properties and maximum bioactive peptides. In FIG. 1 the degree of hydrolysis is represented qualitatively on the x axis. The window of opportunity is between the points $x_1$ and $x_2$ which will vary depending on the enzyme which is used. The optimum conditions sought are a maximum bioactivity with an acceptable level of bitterness.

In particularly preferred embodiments of the process of the invention, the enzyme which hydrolyses the whey proteins is selected from the group consisting of Protease P6, Protease A, Protease M, Peptidase, Neutrase, Validase and AFP 2000 (all as herein defined) and the hydrolysis of the whey proteins is terminated by heat treatment for a short time at a high temperature (about 85–100° C. for 1–10 seconds). The applicants have surprisingly found that the above enzymes (1) are able to produce a whey protein hydrolysate containing a good level of bioactive peptides, and (2) can be inactivated by a short time, high temperature treatment which causes only partial denaturation of the whey proteins in the hydrolysate, and surprisingly improves the organoleptic properties of the whey proteins, in terms of providing a product which is creamy in texture has a relatively small particle size) and substantially white in appearance.

The present invention is now exemplified by the following examples:

EXAMPLE 1

A 10% solution of a sweet whey protein concentrate with 80% protein content (ALACEN™ 392, 2 L) was hydrolysed at 50° C. with the commercially available enzyme Neutrase sourced from Bacillus subtilis (Novo Nordisk, Denmark). A pH of 7.0 and an enzyme substrate ratio of 0.3% w/w was used for the hydrolysis. The hydrolysate was adjusted to pH 5.0 and heated at 65° C. for 30 min to inactivate the enzyme. The hydrolysate (DH of 4.5%) was spray dried and tested for angiotensin-converting enzyme inhibitor (ACE-I) activity and flavour. ACE-I activity in the dried product was determined using FAPGG as a substrate (Product 305-10 ex Sigma Chemical Corporation, St Louis, Mo., USA) according of the method of D W Cushman & H S Cheung (1971). ACE-I activities are expressed as the amount of material (g/L) needed to reduce the activity of the ACE-I enzyme by 50%. $IC_{50}$ ACE-I activity in the hydrolysate was 0.44 g/L and flavour acceptability score, as determined by a taste panel, was very high.

EXAMPLE 2

A 50% solution of ALACEN™ 421 whey protein concentrate (56% protein content, 10 L) was treated with commercial lactase sourced from Kluveromyces lactis (Lactozyme 3000 L ex Novo Nordisk) at an enzyme to substrate ratio of 0.3% at 50° C. for 2 hours. The lactase treated solution was hydrolysed with Neutrase (Novo Nordisk, Denmark) for 1 hour at 50° C. at an enzyme substrate ratio of 0.3%. Active enzymes were inactivated by UHT treatment (5 sec at 95° C.) after a five fold dilution of the mixture. The hydrolysate was spray dried. The dry powder (DH 2.8%) contained no traces of active enzyme and had an ACE-I activity of 2.18 g/L. The flavour score was exceptionally high due to the introduction of a low level of sweetening into the product. ACE-I measurements and flavour acceptability scoring were determined as for Example 1.

EXAMPLE 3

A 500 L hydrolase, made from ALACEN™ 392 in a similar way to that in example 1, was cooled to 10° C. after enzyme activation. A sub-sample of the original hydrolysate was dried. The remaining hydrolysate was subjected to ultrafiltration at 10° C. with a 10,000 dalton nominal molecular weight cutoff membrane (HFK 131, Koch Membrane Systems, USA). The hydrolysate (at a DH between 3.8% and 4.2%) was concentrated to a VCF 10 and the retentate was dried directly. The permeate was concentrated by evaporation to approx 25% solids and dried ACE-I measurement and flavour acceptability scoring were determined as for Example 1. The ACE-I activity was enriched in the permeate powder ($IC_{50}$ of the permeate powder was 0.15 g/L). ACE-I activity in the sub-sample of the dried hydrolysate before ultrafiltration was 0.43 g/L. The flavour acceptability scores on the retentate powder and the spray dried powder of the feed were both high.

EXAMPLE 4

Three different solutions from ALACEN™ 392, ALACEN™ 421 and a mixture of ALACEN™ 392 and lactose were made up at 15% solids to yield 150 L. The solution was treated with a commercial protease from *Bacillus subtilis* Neutrase (Novo, Nordisk Denmark) and a commercial lactase from *Klyvermyces lactis* (Lactozyme 3000 L ex Novo Nordisk). The addition rate of enzyme was 0.3% w/w (on protein basis) for Neutrase and 1.2% w/w (on lactase basis) for Lactozyme. The reaction continued for 2 h at 50° C. at a pH of 7.0. Samples of 35 L were taken every 0.5 h inactivated at 88° C. for 3 seconds and subsequently spray dried. The ACE-I activity as specified in example 1 yielded 0.424 g/L, 0.336 g/L and 0.432 g/L for the three mixtures on a protein basis. The bitterness of the samples from ALACEN™ 392 was formally evaluated against two standard hydrolysates. The scores for bitterness on a scale of 1 to 10, 10 being most bitter were 1.9 for a sample after 0.5 h hydrolysis, 2.3 for the 2 h hydrolysis compared to 5 and 7 for the standard hydrolysis samples of greater degrees of hydrolysis.

The samples of ALACEN™ 421 and a mixture of ALACEN™ 392 and lactose taken after 2 h had a mean particle size of 3 µm or 2 µm respectively. The sample of ALACEN™ 392 had a mean particle size of 6 µm after 2 h hydrolysis and inactivation as specified. Less grittiness and chalkiness was attributed to the smaller particle size samples.

The solubility of the hydrolysed ALACEN™ 392/lactose mixture was the highest with approximately 85% across the pH range. The ALACEN™ 392, ALACEN™ 421 samples are soluble to about 70% with a slight drop in solubility to 65% at pH 3.5.

EXAMPLE 5

Three different solutions from ALACEN™ 392, ALACEN™ 421 and a mixture of ALACEN™ 392 and lactose wee made up of 30% solids to yield 75 L. The enzyme treatment was done using the same conditions as example 4. The samples taken at half hourly intervals were diluted to 15% solids. Otherwise the heat treatment was done as in example 4. The ACE-I activity measured as specific in example 1 was 0.560 g/L, 0.440 g/L and 0.780 g/L.

Samples from example 4 and 5 were added in a concentration of 0.1% to the standard growth media of *Bifidobacterium lactis* and resulted in a faster cell growth and higher final cell density of the strain than the control without any supplement.

The oligosaccharide level (trisaccharides and higher) of those hydrolysed samples was 0.2%, 2.1% and 7.0% in ALACEN™ 392, ALACEN™ 421 and the mixture of ALACEN™ 392 and lactose, respectively.

EXAMPLE 6

Hydrolysate powders prepared in example 5 were used as a supplement for yoghurts in addition rates from 2.5% and 5% of the final yoghurt and resulted in an increased creaminess and improved the texture compared to the control.

EXAMPLE 7

The hydrolysate powders prepared in example 5 were used as the protein source in a muesli bar recipe on a 6% and 12% w/w addition rate. All tasters preferred the hydrolysate bars over the unhydrolysed WPC control. The best results were achieved with hydrolysed ALACEN™ 421 and a mixture of ALACEN™ 392 and lactose prepared in example 5.

EXAMPLE 8

The hydrolysate powder prepared in example 5 was used as an ingredient in a meal replacer concept sample. ALACEN™ 421 hydrolysed in lactose and protein was added at a rate of 45% w/w to whole milk powder, malto dextrin, sucrose and milk calcium (ALAMIN™) to result in a powder meal replacer prototype. In comparison with a control sample without hydrolysed whey protein, hydrolysed whey protein prepared in example 5 was found to be more acceptable.

EXAMPLE 9

A nutritional whey protein drink was formulated containing 8% w/w of ALACEN™ 392 or ALACEN™ 421 or a mixture of ALACEN™ 392 and lactose hydrolysed as specified in example 5. The drink also contained sucrose, citric acid, flavouring and colouring agents. The pH of the drink was adjusted to 4.3. The drink combined the nutritional and health advantages of whey protein with the refreshing taste of a soft drink. Compared to a drink containing untreated whey protein control the pH stability was improved and the drink had a more milk like appearance than the control.

EXAMPLE 10

A further nutritional protein drink was formulated containing 12.5% w/w of ALACEN™ 421 hydrolysed as in example 5 in water mixed with pasteurised whole milk. Sucrose was added to yield 6% of the final formulation as well as stabiliser. The drink was flavoured when desired with banana, vanilla or similar flavours. To achieve an extended shelf life the drink was ultra high heated to 140° C. for 3 seconds. The mean particle size remains at 3 microns after te additional UHT heat treatment.

EXAMPLE 11

The hydrolysis was carried out as specified in example 5 but instead of reconstituting ALACEN™ 421 powder a fresh retentate of ALACEN™ was concentrated to 30% solids in the solution. The neutrase addition rate was varied to 0.9% w/w (on a protein base), the lactase level as specified. The reaction mixture was inactivated at 15% solids after 2 h. The ACE-I activity yielded 0.480 g/L. The organoleptic properties, particle size and food application were very similar to example 4 and 5.

EXAMPLE 12

The hydrolysis was carried out as specified in example 4 with ALACEN™ 421 powder. The Neutrase addition rate was varied to 0.9% w/w (on a protein basis). Te lactose was converted with a lactase from *Aspergillus oryzae* (Fungal lactase 30,000, Kyowa Enzymes Co. Ltd. Japan) on an addition rate of 0.4% w/w (on lactose base). The reaction mixture was inactivated after 1.5 h with direct steam injection to achieve a temperature of 88° C. for either 1.5 seconds or 3 seconds.

The particle size was 2.3 microns. Organoleptic properties and food application were very similar to the product of example 4.

EXAMPLE 13

A 10% w/w solution of ALACEN™ 392 was hydrolysed with a commercial protease from *Bacillus subtilis* Neutrase (Novo, Nordisk Denmark) at an enzyme concentration of 0.9% w/w. The reaction continued for 6 h at 50° C. Samples of 200 ml were taken every 1 h, inactivated at 88° C. for 8 seconds and subsequently freeze dried.

ACE-I activity, degree of hydrolysis, pH of solution and bitterness developed over time as follows. The higher the bitterness score the more bitter is the taste. The smaller the level measured the higher is the ACE-I activity.

TABLE 1

Hydrolysis of ALACEN ™ 392 WPC

| Hydrolysis time [h] | ACE-I activity [g/L] ($IC_{50}$) | Degree of hydrolysis [%] | pH of solution | Bitterness score [informal, 0–10] |
|---|---|---|---|---|
| 1 | 0.420 | 3.86 | 7.01 | 0 |
| 2 | 0.280 | 3.78 | 6.96 | 1 |
| 3 | 0.230 | 4.53 | 6.92 | 1 |
| 4 | 0.220 | 4.89 | 6.89 | 3.5 |
| 5 | 0.210 | 5.20 | 6.87 | 2 |
| 6 | 0.190 | 5.37 | 6.87 | 4.5 |

EXAMPLE 14

A 10% solution of ALACEN™ 392 was hydrolysed with the following commercial proteases at 1% w/w, 50° C. for 1 h. The reaction was inactivated at 88° C. for 8 seconds and subsequently the hydrolysate was freeze dried.

TABLE 2

Hydrolysis with Different Enzymes

| Enzyme | ACE-I activity [g/L]($IC_{50}$) | pH | Degree of hydrolysis [%] |
|---|---|---|---|
| Protease P6, neutral protease, *Aspergillus* strains, Amano Enzymes | 0.274 | 7.0 | 8.9 |
| Protease A, neutral protease, *Aspergillus oryzae*, Amano Enzymes | 0.443 | 7.0 | 9.2 |
| Protease M, acid protease, *Aspergillus oryzae*, Amano Enzymes | 0.450 | 4.0 | 7.4 |
| Peptidase, neutral peptidase, *Aspergillus oryzae*, Amano Enzymes | 0.540 | 7.0 | 6.9 |
| Neutrase, neutral bacterial protease, *Bacillus subtillis*, Novo Nordisk DK | 0.510 | 7.0 | 4.3 |
| Validase (Genancor), acid fungal protease, *Aspergillus niger*, Enzyme Services Ltd. NZ | 0.510 | 4.0 | 5.6 |
| AFP 2000 (Genancor), acid fungal protease, *Aspergillus niger*, Enzyme Services Ltd. NZ | 0.550 | 4.0 | 3.9 |

EXAMPLE 15

Identification of ACEI-Peptides and Measuring their Activities 200 mg of permeate from example 3 was dissolved in 0.1% trifluoroacetic acid (TFA) and applied to a Jupiter preparative reverse-phase HPLC column (10 micron, C18, 22×250 mm [Phenomenex NZ]) equilibrated with solvent A (0.1% TFA) and connected to an FPLC system (Pharmacia). Peptides were sequentially eluted from the column with a gradient of 0 to 43% solvent B (0.08% 1FA in acetonitrile) in 245 min at a flow rate of 10 mL/min. Peptides eluting from the column were detected by monitoring the absorbance of the eluate at 214 nm. The eluate was collected by an automatic fraction collector set to collect 3 min fractions.

Each fraction was lyophilised and the amount of peptide material present was measured gravimetrically. Fractions were assayed for ACE-I activity using an in vitro assay system (reagents from Sigma product 305-10) consisting of rabbit lung ACE and the colorimetric ACE subset furylacryloylphenylalanylglycylglycine (FAPGG); ACE hydrolyses FAPGG to give the products FAP and GG which results in a decrease in absorbance at 340 mm. If a peptide inhibits ACE, the change in absorbance at 340 nm is reduced. Fractions contain the highest ACE inhibitory activity per mg peptide material were re-applied to the preparative reverse-phase HPLC column and eluted using a shallow gradient of solvent B i.e. 0.09% increase in solvent B concentration/ min. The eluate was collected using the fraction collector set to collect 0.5 min fractions.

Samples from each fraction were analysed using an analytical reverse-phase HPLC column, and those fractions containing a single, identical peptide were pooled. Each pooled fraction was lyophilised and the weight of the peptide present was determined gravimetrically. The purified peptides were assayed for ACE-I activity as before and the $IC_{50}$ was calculated for c individual peptide.

The molecular weight of each peptide was determined by Electrospray Ionisation Mass Spectrometry (Sciex API 300 triple quadrupole mass spectrometer). Tandem mass spectrometry was also done for each peptide to generate CAD spectra using MSMS experiment scans. Each peptide was also analysed by an automated N-terminal sequencer (ABI model 476A protein sequencer). Data collected from all three techniques was used to deduce the sequence of all of the peptides possessing ACE-I activity. The origin of each of the active peptides was determined by searching a database containing the known sequences of all bovine milk proteins.

The peptides, their origins, activities and known similarities am set out in table 3. Although the last three peptides are of a casein origin they were from a whey protein hydrolysate. The rennet used to precipitate casein did not precipitate these casein fractions and they remained with the whey proteins.

TABLE 3

ACE-I Peptides and their Activities

| Peptide Sequence[a] | Origin | Activity[b] ($IC_{50}$ in mg L$^{-1}$) | Similarity to known ACE-I Peptides |
|---|---|---|---|
| AFE (Ala-Phe-Glu) | PP$^D$3(129–131) | 20 | |
| LFSH (Leu-Phe-Ser-His) (SEQ ID NO: 1) | PP3(125–128) | 30 | |
| ILKEKH (Ile-Leu-Lys-Glu-Lys-His) (SEQ ID NO: 2) | PP3(71–76) | 20 | |

TABLE 3-continued

ACE-I Peptides and their Activities

| Peptide Sequence[a] | Origin | Activity[b] (IC$_{50}$ in mg L$^{-1}$) | Similarity to known ACE-I Peptides |
|---|---|---|---|
| LIVTQ (Leu-Ile-Val-Thr-Gln) (SEQ ID NO: 3) | β-LG[e](1–5) | 17 | |
| MKG (Met-Lys-Gly) | β-LG(7–9) | 24 | |
| LDIQK[c] (Leu-Asp-Ile-Gln-Lys) (SEQ ID NO: 4) | β-LG(10–14) | 17 | β-LG(9–14) |
| VF (Val-Phe) | β-LG(81–82) | 19 | |
| ALPMH (Ala-Leu-Pro-Met-His) (SEQ ID NO: 5) | β-LG(142–146) | 12 | β-LG(142–148) |
| VTSTAV (Val-Thr-Ser-Thr-Ala-Val) (SEQ ID NO: 6) | GMP[f](59–64) | 30 | |
| LHLPLP (Leu-His-Leu-Pro-Leu-Pro) (SEQ ID NO: 7) | β-CN[g](133–138) | 7 | |
| LVYPFPGPIPNSLPQNIPP (Leu-Val-Tyr-Pro-Phe-Pro-Gly-Pro-Ile-Pro-Asn-Ser-Leu-Pro-Gln-Asn-Ile-Pro-Pro) (SEQ ID NO: 8) | β-CN(58–76) | 19 | β-CN(74–76) |
| LFRQ (Leu-Phe-Arg-Glu) (SEQ ID NO: 9) | α$_{s1}$-CN(136–139) | 17[h] | |

[a]sequence given using the single-letter amino acid code with the corresponding three-letter code in brackets
[b]using the colorimetric substrate FAPGG
[c]most abundant ACE-I in hydrolysate
[d]protease peptone
[e]β-lactoglobulin
[f]glycomacropeptide
[g]β-casein
[h]activity measured with that of another peptide of unknown origin

EXAMPLE 16

The effect of the hydrolysate powder prepared in example 3 (without ultrafiltration) on in vivo blood pressure was tested using spontaneously hypertensive rats (SHR/N). The rat strain has been specifically selected for their development of high blood pressure on maturing, and is used extensively to monitor the effect of blood pressure lowering agents. They were purchased from Animal Resources Centre, P O Box 1180 Caning Vale, Western Australia 6155.

Eight week old rats were individually housed in plastic rat cages and kept in temperature controlled facilities throughout the trial. They had unlimited access to water and were fed commercial rat chow ad libitum. The test products were given orally as a single daily dose for 8 weeks during which time changes in blood pressure were monitored. Their blood pressure was measured using a specially designed tail cuff and blood pressure monitoring apparatus (IITC Ins., Life Science Instruments, 23924 Victory Blvd, Woodland Hilld, Calif. 91367). The experimental design was approved by the Massey University Animal Ethics Committee, protocol number 98/141.

Figure 2:
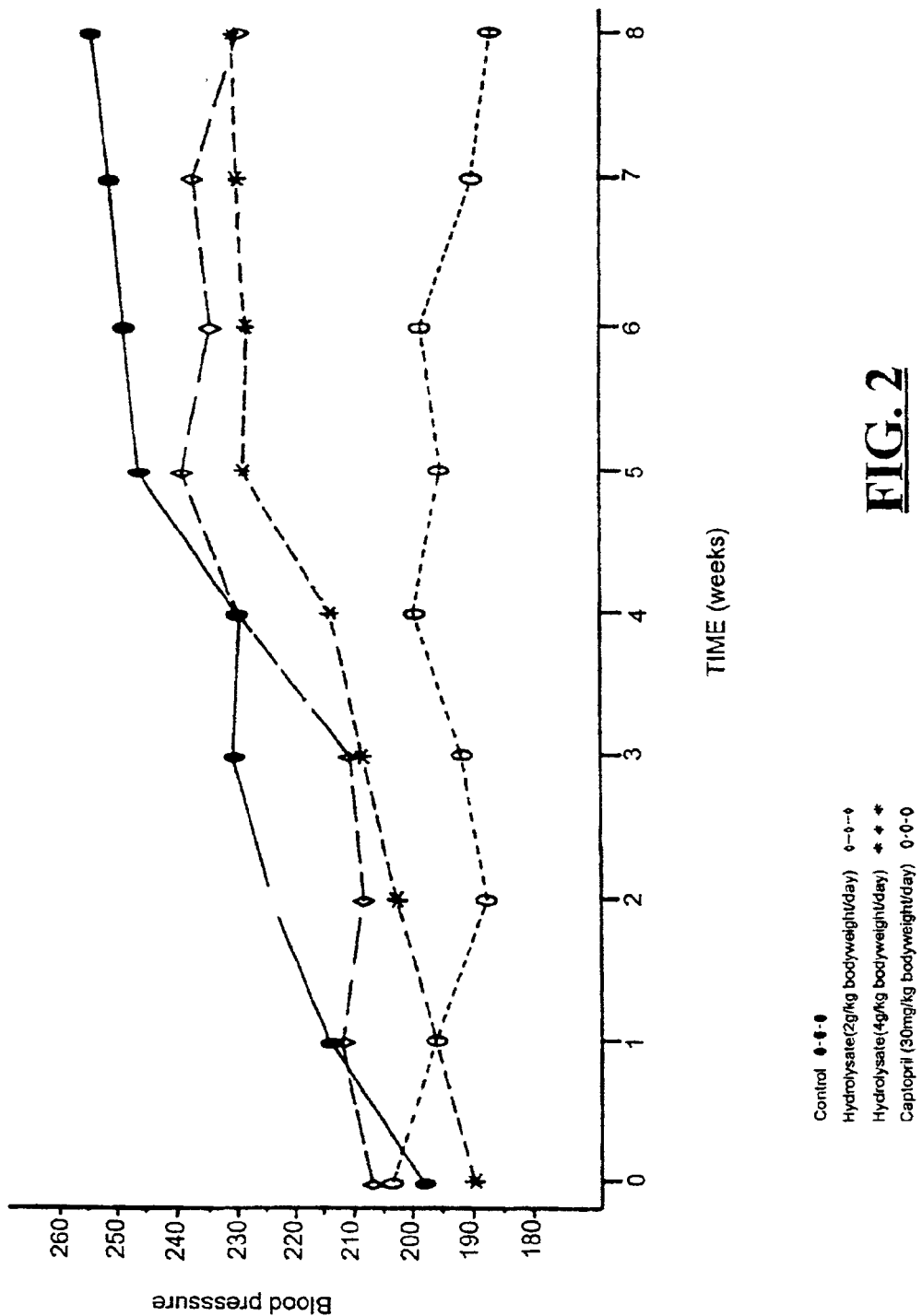
FIG. 2 is a plot of systolic blood pressure of four groups of hypertensive rats fed different diets over a period of eight weeks.

The changes in the systolic blood pressures of each group of animals over the eight weeks are plotted in FIG. 2 (as least squares means). The hydrolysate at both 2 g/Kg bodyweight/day and 4 g/Kg bodyweight/day significantly lowered the systolic blood pressure of SHRs compared to animals fed commercial rat chow only (p<0.004 by least-squares means analysis, see FIG. 3). The effect of the hydrolysate was not as great as that of captopril, a known ACE-I inhibitory drug administered at 30 mg/Kg bodyweight/day, but was a significant improvement for animals fed commercial rat chow only.

REFERENCES

Bernal & Jelen P (1989). Effectiveness of lactose hydrolysis in Cottage cheese whey for the development of whey drinks. *Milchwissenchaft* 44: 222–225.

Cushman D W & Cheung H S (1971). Spectrophotometric assay and properties of the angiotensin converting enzyme in rabbit lung. Biochem Pharmacol 20: 1637–1648.

FR 2309154, 30 Dec. 1976 Fromageries Bel La Vache Qui (From), France.

U.S. Pat. No. 3,970,520, 20 Jul. 1976, General Electric Co, USA.

EP0117047, 29 Aug. 1984. General Foods Corporation, USA.

Maubois J L, Léonil J, Trouvé R & Bouhallab S (1991) Les peptides du lait à activité physiologique III. Peptides du lait à effect cardiovasculaire: activités antithrombotique et antihypertensive. *Lait,* 71, 249–255.

JP 4282400, 7 Oct. 1992, Calpis Shokuhin Kogyo KK, Japan.

EP065663, 1 Dec. 1982, Miles Laboratories Incorporated. USA.

JP 8056568, 17 Aug. 1994. Morinaga Milk Co Ltd, Japan.

EP4745506, 11 Mar. 1992, Morinaga Milk Co Ltd, Japan.-

Mullally M M, Merisel H & FitzGerald R J (1997) Identification of a novel angiotensin-I-converting enzyme inhibitory peptide corresponding to a tryptic fragment of bovine β-lactoglobulin. *Federation of European Biochemical Societies Letters*, 402, 99–101.

Nakamura Y, Yamamoto N, Sakai K & Takano T (1994) Antihypertensive effect of the peptides derived from casein by an extracellular proteinase from *Lactobacillus helveticus* CP790. *Journal of Dairy Science*, 77, 917–922.

Ray G (1992). Bitterness: reduction and inhibition. *Trends in Food Science and Technology* 3: 85–91.

Roy G (1997). Modifying bitterness: Mechanism, ingredients and applications. Technomic Publishers, Lancaster, UK.

U.S. Pat. No. 4,358,464, 9 Sept. 1982, Superior Dairy Company. USA.

Yamamoto N (1997). Antihypertensive peptides derived from food proteins. *Biopolymers* 43: 129–134.

What is claimed is:

1. An isolated peptide selected from the group consisting of AFE, LFSH (SEQ ID NO: 1), ILKEKH (SEQ ID NO: 2), LIVTQ (SEQ ID NO: 3), MKG, LDIQK (SEQ ID NO: 4), ALPMH (SEQ ID NO: 5), VTSTAV (SEQ ID NO: 6), LVYPFGPIPNSLPQNIPP (SEQ ID NO: 8) and LFRQ (SEQ ID NO: 9).

2. A method of reducing systolic blood pressure in a subject which comprises:

individually isolating one or more peptides selected from the group consisting of AFE, LFSH (SEQ ID NO: 1), ILKEKH (SEQ ID NO: 2), LIVTQ (SEQ ID NO: 3), MKG, LDIQK (SEQ ID NO: 4), ALPMH (SEQ ID NO: 5), VTSTAV (SEQ ID NO: 6), LVYPFGPIP-NSLPQNIPP (SEQ ID NO: 8) and LFRQ (SEQ ID NO: 9); and administering an effective amount of a composition comprising the isolated peptide or peptides.

* * * * *

SEQUENCE LISTING

```
<160> NUMBER OF SEQ ID NOS: 9

<210> SEQ ID NO 1
<211> LENGTH: 4
<212> TYPE: PRT
<213> ORGANISM: Unknown
<220> FEATURE:
<223> OTHER INFORMATION: Synthetic peptide identified from a mammalian
      whey protein mixture.

<400> SEQUENCE: 1

Leu Phe Ser His
 1

<210> SEQ ID NO 2
<211> LENGTH: 6
<212> TYPE: PRT
<213> ORGANISM: Unknown
<220> FEATURE:
<223> OTHER INFORMATION: Synthetic peptide identified from a mammalian
      whey protein mixture.

<400> SEQUENCE: 2

Ile Leu Lys Glu Lys His
 1               5

<210> SEQ ID NO 3
<211> LENGTH: 5
<212> TYPE: PRT
<213> ORGANISM: Unknown
<220> FEATURE:
<223> OTHER INFORMATION: Synthetic peptide identified from a mammalian
      whey protein mixture.

<400> SEQUENCE: 3

Leu Ile Val Thr Gln
 1               5

<210> SEQ ID NO 4
<211> LENGTH: 5
<212> TYPE: PRT
<213> ORGANISM: Unknown
<220> FEATURE:
<223> OTHER INFORMATION: Synthetic peptide identified from a mammalian
      whey protein mixture.

<400> SEQUENCE: 4

Leu Asp Ile Gln Lys
 1               5

<210> SEQ ID NO 5
<211> LENGTH: 5
<212> TYPE: PRT
<213> ORGANISM: Unknown
<220> FEATURE:
```

-continued

```
<223> OTHER INFORMATION: Synthetic peptide identified from a mammalian
      whey protein mixture.

<400> SEQUENCE: 5

Ala Leu Pro Met His
1               5

<210> SEQ ID NO 6
<211> LENGTH: 6
<212> TYPE: PRT
<213> ORGANISM: Unknown
<220> FEATURE:
<223> OTHER INFORMATION: Synthetic peptide identified from a mammalian
      whey protein mixture.

<400> SEQUENCE: 6

Val Thr Ser Thr Ala Val
1               5

<210> SEQ ID NO 7
<211> LENGTH: 6
<212> TYPE: PRT
<213> ORGANISM: Unknown
<220> FEATURE:
<223> OTHER INFORMATION: Synthetic peptide identified from a mammalian
      whey protein mixture.

<400> SEQUENCE: 7

Leu His Leu Pro Leu Pro
1               5

<210> SEQ ID NO 8
<211> LENGTH: 19
<212> TYPE: PRT
<213> ORGANISM: Unknown
<220> FEATURE:
<223> OTHER INFORMATION: Synthetic peptide identified from a mammalian
      whey protein mixture.

<400> SEQUENCE: 8

Leu Val Tyr Pro Phe Pro Gly Pro Ile Pro Asn Ser Leu Pro Gln Asn
1               5                   10                  15

Ile Pro Pro

<210> SEQ ID NO 9
<211> LENGTH: 4
<212> TYPE: PRT
<213> ORGANISM: Unknown
<220> FEATURE:
<223> OTHER INFORMATION: Synthetic peptide identified from a mammalian
      whey protein mixture.

<400> SEQUENCE: 9

Leu Phe Arg Gln
1
```